(12) United States Patent
Matteson

(10) Patent No.: US 6,317,477 B1
(45) Date of Patent: Nov. 13, 2001

(54) FLOATING POOL SEAL ASSEMBLY WITH LEAK LIMITING ANNULAR SUPPORT STRUCTURE

(75) Inventor: Donn M. Matteson, Windsor, CT (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 0 days.

(21) Appl. No.: 09/287,630

(22) Filed: Apr. 7, 1999

(51) Int. Cl.$^7$ .......................... G21C 13/028; F16J 15/46
(52) U.S. Cl. .......................... 376/203; 277/637; 277/645
(58) Field of Search .......................... 376/203, 205, 376/206, 263; 277/605, 645, 637, 616, 630

(56) References Cited

U.S. PATENT DOCUMENTS

| | | | |
|---|---|---|---|
| 4,214,760 | * | 7/1980 | Godfrey .......................... 277/34.3 |
| 4,753,768 | * | 6/1988 | Puri .......................... 376/205 |
| 4,758,402 | * | 7/1988 | Schukei et al. .......................... 376/205 |
| 4,908,179 | | 3/1990 | Brookins .......................... 376/203 |
| 5,102,612 | | 4/1992 | McDonald et al. .......................... 376/203 |
| 5,359,632 | * | 10/1994 | Bottoms et al. .......................... 376/203 |

FOREIGN PATENT DOCUMENTS

3013891 * 1/1991 (JP) .

* cited by examiner

Primary Examiner—Charles T. Jordan
Assistant Examiner—Kyongtaek K. Mun

(57) ABSTRACT

A seal assembly for sealing a space between an annular flange on a nuclear reactor vessel and a surrounding ledge of a refueling canal to provide a temporary water barrier during refueling operations. The seal assembly includes an annular closure plate having an outer portion secured to the surrounding ledge and an inner portion supporting a first sealing surface. A second sealing surface opposing the first sealing surface is formed on or secured to the annular flange of the reactor vessel. An annular space between the first and second sealing surfaces provides a ventilation path from the reactor cavity during normal plant operation. The annular space is sealed by an inflatable seal during refueling operations to provide a water barrier between the refueling canal and the reactor vessel. The inflatable seal is secured to and supported by an annular support structure that straddles the annular space. The annular support structure provides a structure for handling the inflatable seal during installation and removal. The annular support structure also provides a leak limiting function in the event the inflatable seal is pulled or pushed through the annular space or otherwise fails to seal the annular space. The inflatable seal is secured to the annular support structure in a manner that allows independent movement of the seal to conform to irregularities in the sealing surfaces. The closure plate has a plurality of normally closed access ports that permit access to the external core detectors and the reactor vessel cavity.

13 Claims, 6 Drawing Sheets

FLOATING POOL SEAL ASSEMBLY WITH LEAK LIMITING ANNULAR SUPPORT STRUCTURE

BACKGROUND OF THE INVENTION

1. Field of the Invention

The present invention relates generally to sealing a space between adjacent plates or ledges. In particular, the invention relates to sealing the space between an annular flange on a nuclear reactor vessel and a surrounding ledge of a refueling canal to provide a temporary water barrier between the refueling canal and the reactor vessel during refueling operations.

2. Description of the Related Art

The conditions giving rise to the problems solved by the present invention are commonly found in nuclear reactor power plants. In particular, the refueling process in pressurized water reactors must be performed under approximately 25 feet of water in a refueling canal above the reactor vessel, while the reactor vessel cavity under the canal must be maintained dry. During normal power operation the refueling canal is dry and, with the vessel cavity, forms a single large enclosure. Typically, a portion of the floor of the refueling canal forms a ledge opposite a flange attached to the upper portion of the reactor vessel. The ledge and flange provide sealing surfaces on which prior art canal sealing interfaces were effected.

Conventional refueling pool seals are of two general types: temporary and permanent. Temporary seals typically comprise a ring plate having an outside diameter of about 25 feet and a width of from 1 to 3 feet. Compression elastomer seals carried on the underside of the ring plate rested on the flange and ledge. The ring plate was bolted down to the flange and ledge to compress the seals and form a watertight fit.

Another temporary seal was developed having a rigid plate bridging the annular space to be sealed, and a pair of inflatable seals positioned between the reactor vessel flange and the rigid plate, and between the rigid plate and the ledge of the refueling canal. This arrangement is disclosed, for example, in U.S. Pat. No. 4,908,179, which issued to Robert H. Brookins on Mar. 13, 1990, and was assigned to Combustion Engineering, Inc., assignee of the present application. These temporary seal arrangements are relatively difficult and time consuming to install, thereby resulting in an undesired amount of occupational radiation exposure.

Permanent seal arrangements have been developed that remain in place during normal power operation and during refueling. An example of a permanent refueling pool seal is disclosed in U.S. Pat. No. 5,102,612, which issued to Michael S. McDonald et al. on Apr. 7, 1992, and was assigned to Combustion Engineering, Inc., assignee of the present application. This permanent seal comprises annular deck sections supported on spaced ribs around the annular space to be sealed. The inside and outside diameters of the deck sections are welded to flexible membranes to make a watertight seal between the reactor vessel flange and the ledge of the refueling pool cavity. The deck sections include openings with removable seal covers. These openings provide reactor cavity cooling air flow and an access path to the reactor vessel cavity and external core detectors when the seal covers are removed. However, removal of the seal covers to establish a ventilation path from the reactor cavity during plant operation is time consuming, thereby resulting in an undesired amount of occupational radiation exposure.

SUMMARY OF THE INVENTION

It is an object of the present invention to provide an improved seal assembly for establishing a temporary water barrier between a refueling canal and a reactor vessel during refueling with a minimal amount of occupational radiation exposure.

It is a further object of the present invention to provide an improved seal assembly that can be quickly installed for sealing the space between an annular flange on a nuclear reactor vessel and a surrounding ledge of a refueling canal during refueling, and can be quickly removed to establish a ventilation path from the reactor cavity during normal plant operation.

It is a further object of the present invention to provide an improved seal assembly that uses an inflatable seal to establish a primary sealing interface, and an annular support structure that supports the inflatable seal and provides a leak limiting function in the event the inflatable seal fails.

It is a further object of the present invention to provide an improved seal assembly having a permanently installed closure plate with a plurality of access ports. and a ventilation path that permits adequate ventilation of the reactor cavity without the removal of seal covers from the access ports.

To achieve these objects, the present invention provides a seal assembly for sealing a space between an annular flange on a nuclear reactor vessel and a surrounding ledge of a refueling canal to provide a temporary water barrier during refueling operations. The seal assembly includes an annular closure plate having an outer portion secured to the surrounding ledge and an inner portion supporting a first sealing surface. A second sealing surface opposing the first sealing surface is formed on or secured to the annular flange of the reactor vessel. An annular space between the first and second sealing surfaces provides a ventilation path from the reactor cavity during normal plant operation. The annular space is sealed by an inflatable seal during refueling operations to provide a water barrier between the refueling canal and the reactor cavity.

The inflatable seal is secured to and supported by an annular support structure that straddles the annular space. The annular support structure provides a structure for handling the inflatable seal during installation and removal. The annular support structure also provides a leak limiting function in the event the inflatable seal is pulled or pushed through the annular space or otherwise fails to seal the annular space. The inflatable seal is secured to the annular support structure in a manner that allows independent movement of the seal to conform to irregularities in the sealing surfaces. The closure plate has a plurality of normally closed access ports that permit access to the external core detectors and the reactor vessel cavity. The access ports need not be opened during normal plant operation since the annular space provides sufficient ventilation for the reactor vessel.

According to a broad aspect of the present invention, a seal assembly is provided for sealing an annular space between two adjacent annular surfaces. The seal assembly comprises an inflatable annular seal, and an annular support structure connected to and supporting the inflatable seal. The annular support structure has a generally rigid structure that straddles the annular space to be sealed and engages the surfaces on both sides of the annular space. The annular support structure provides a means for handling the inflatable seal during installation and removal and provides a leak limiting structure in the event the inflatable seal fails.

The inflatable seal has a plurality of threaded inserts embedded in an upper surface of the seal. The annular support structure has a plurality of slotted openings or retainers through which shoulder bolts extend to engage the threaded inserts for connecting the annular support structure to the inflatable seal. This mounting arrangement allows the inflatable seal to move vertically and transversely relative to the annular support structure to facilitate self alignment of the inflatable seal within the annular space.

The inflatable seal is an annular elastomer structure having an upper wedge portion and a lower tubular portion. The lower tubular portion is expandable when pressurized to engage lower edges of the surfaces on each side of the annular space to form a secondary seal. The upper wedge portion is drawn into engagement with upper edges of the surfaces on each side of the annular space to form a primary seal when the tubular portion is further pressurized.

According to another broad aspect of the present invention, a method is provided for sealing a space between an annular flange on a nuclear reactor vessel and a surrounding ledge of a refueling canal to provide a temporary water barrier during refueling operations. The method comprises the steps of: providing first and second sealing surfaces secured to the surrounding ledge and annular flange, respectively, whereby an annular space between the first and second sealing surfaces provides a ventilation path from the reactor cavity during plant operation; securing an inflatable seal to a generally rigid annular support structure having inner and outer sides; placing the annular support structure over the annular space with the inner and outer sides straddling the annular space and the inflatable seal positioned within the annular space; and inflating the inflatable seal to engage the first and second sealing surfaces and seal the annular space. The method also comprises the step of removing the temporary water barrier by lifting the annular support structure together with the inflatable seal attached thereto from the annular space. With the inflatable seal removed, the annular space provides sufficient ventilation from the reactor cavity during plant operation without removing any other structures.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

A floating pool seal assembly according to the preferred embodiments of the present invention will now be described in detail with reference to FIGS. 1 to 8 of the accompanying drawings.

Figure 1:
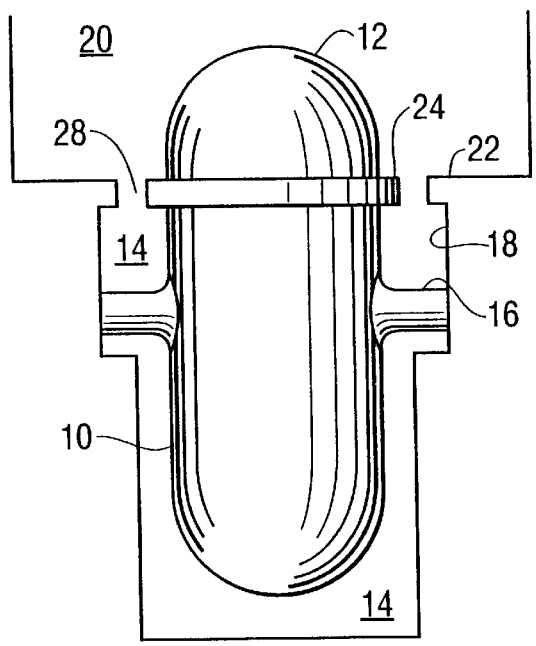
FIG. 1 is a schematic elevation view of a reactor vessel located in a reactor vessel cavity, and a refueling canal located above the reactor vessel cavity.

FIG. 1 shows the environment in which the preferred embodiments of the invention are used. A reactor vessel 10 having a vessel head 12 is located in a reactor vessel cavity 14 and suspended therein by the vessel nozzles 16, which find their support within the cavity walls 18. Above the reactor vessel 10 the cavity walls 18 define a refueling canal or pool 20 having a lower boundary defining a refueling canal ledge 22 generally opposite the vessel flange 24 of the vessel 10.

Refueling of the reactor occurs periodically and consists of filling the refueling canal 20 with water, then removing the vessel head 12 from the vessel 10 so that access may be had to the nuclear fuel (not shown) inside the vessel 10. It is imperative, however, that none of the water in the refueling canal 20 leak into the vessel cavity 14 because refueling water would create contamination problems with the vessel 10 and other equipment in the vessel cavity 14. The annular space 28 between the vessel flange 24 and the cavity ledge 22 cannot be sealed during plant operation because of safety and licensing requirements relating to hypothetical accidents which must be accommodated without damage to any components. In particular, if a vessel nozzle 16 breaks, the flashing liquid must have an escape route from the vessel cavity 14 in order to prevent excessive uplift on the vessel 10 that could further complicate an already serious accident. Therefore, the space 28 must be maintained at least partly open for ventilation and cooling during normal operations and to permit a steam flow path out of the vessel cavity 14. The space 28 may be sealed only during the reactor refueling operation. It must also provide access for maintenance during an outage.

Figure 2:
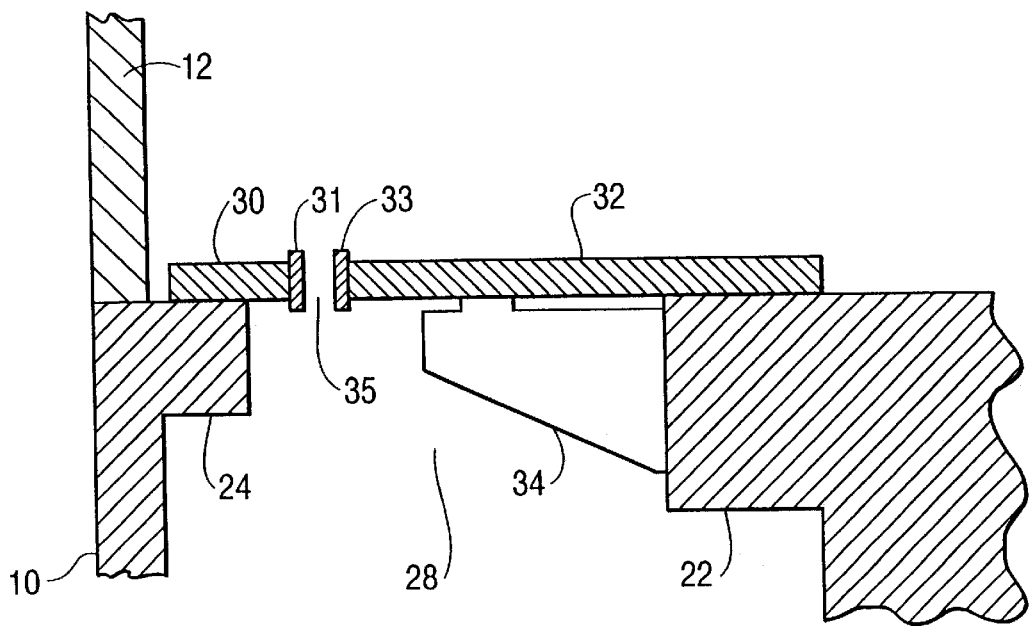
FIG. 2 is a cross-sectional view of the annular interface between the reactor vessel and the surrounding ledge of the refueling canal, with a permanent portion of the seal assembly of the present invention installed on each side of the annular interface.

FIG. 2 shows a portion of the seal assembly of the present invention that is permanently installed to the vessel flange 24 and the canal ledge 22. A ledge ring 30 is secured to the vessel flange 24 by threaded fasteners, welding, or other suitable fastening means. Compression seals can be provided between the ledge ring 30 and the vessel flange 24 to form a watertight fit when the seals are compressed. An annular lip 31 is secured to the outer side of the ledge ring 30 to provide a suitable engaging surface for an inflatable seal 36 (described below).

An annular-shaped closure plate 32 is secured to the canal ledge 22 by threaded fasteners, welding, or other suitable fastening means. The closure plate 32 has inside and outside diametric dimensions sufficient to span most of the distance between the flange 24 and the canal ledge 22 and allow for the closure plate 32 to be secured to the canal ledge 22. Compression seals are provided between the closure plate 32 and the cavity ledge 22 to form a watertight fit when the seals are compressed. An annular lip 33 is secured to the inner side of the closure plate 32 to provide a suitable engaging surface for the inflatable seal member 36. Support arms 34 are provided at spaced intervals to engage the bottom surface of the closure plate 32 and support the closure plate 32. The closure plate 32 and support arms 34 are of sufficient thickness and strength to allow the closure plate 32 to be used as a work platform during outage activities.

In the preferred embodiment, the ledge ring 30 and closure plate 32 are permanently installed to the vessel flange 24 and canal ledge 22, respectively, and are not removed during normal plant operation. The annular space 35 between the ledge ring 30 and the closure plate 32 has a sufficient dimension to provide a ventilation path from the reactor cavity 14 during normal plant operation. Therefore, to seal the reactor cavity 14 from the refueling pool 20 during refueling, only the annular space 35 between the ledge ring 30 and the closure plate 32 must be sealed. The single inflatable seal 36 and leak limiting annular support structure 37 of the present invention provides a structure for sealing this annular space 35.

Figure 3:
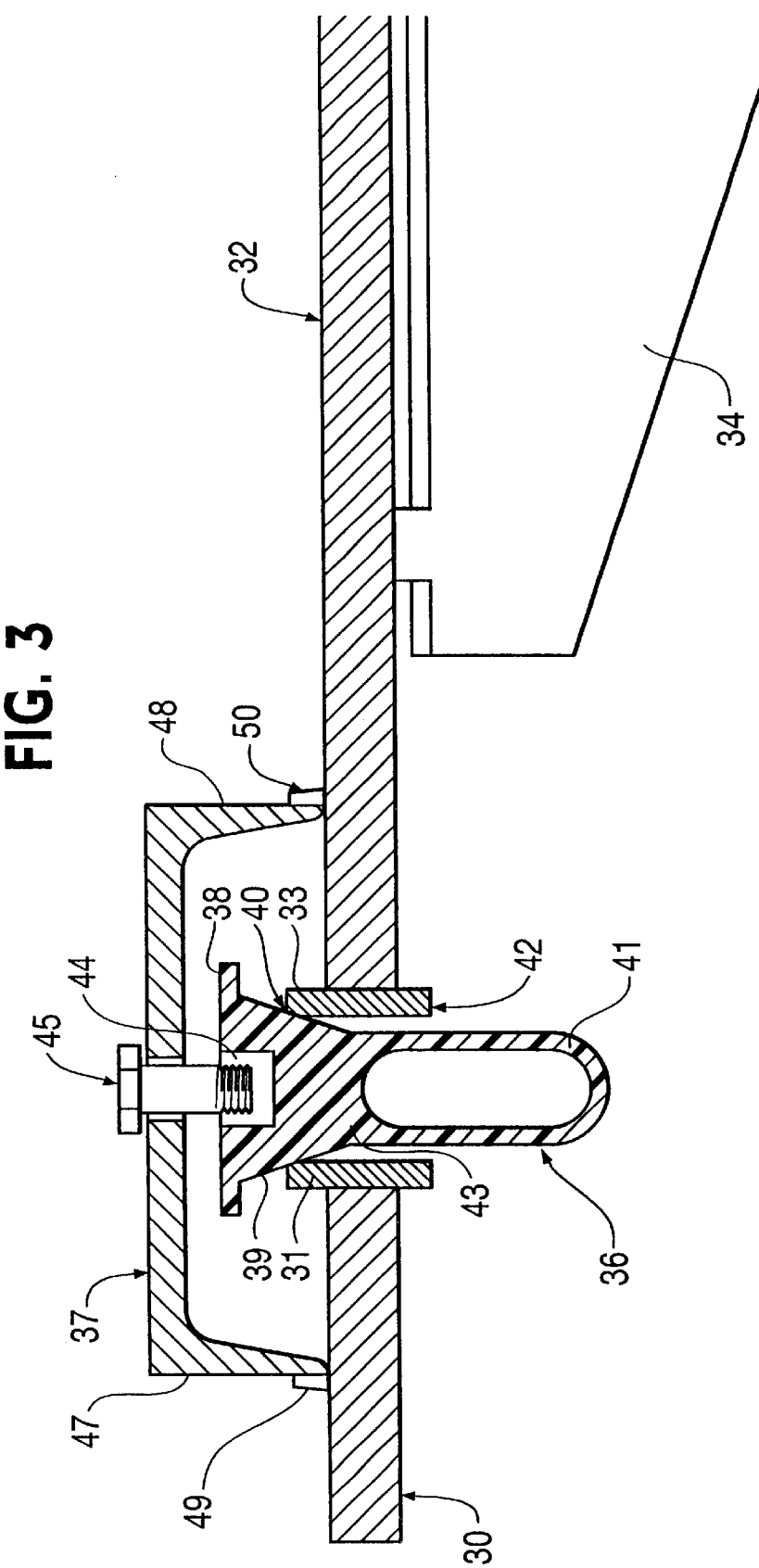
FIG. 3 is a cross-sectional view of the seal assembly according to a first embodiment of the present invention.

FIG. 3 shows a first embodiment of the seal assembly of the present invention with the inflatable seal 36 placed in the annular space 35. The inflatable seal 36 is supported from the leak limiting annular support structure 37 in a manner that allows the seal 36 to move independently of the annular support structure 37 to self align to the annular space 35 between the ledge ring 30 and the closure plate 32.

The seal 36 has an enlarged upper end 38 with a tapered wedge portion 39 that engages primary sealing surfaces 40 on the upper ends of the annular lips 31, 33 supported by the ledge ring 30 and the closure plate 32. The lower end 41 of the seal is tubular and extends below secondary sealing surfaces 42 at the lower ends of the ledge ring 30 and the closure plate 32. The seal 36 has a substantially solid elongated shank portion 43 that extends the seal 36 so that a geographic center, or longitudinal axis, of the tubular portion 41 is positioned below the lower ends 42 of the ledge ring 30 and the closure plate 32. The elongated shank 43 also serves as one boundary of a chamber used for testing the effectiveness of the seal 36, as explained below.

Figure 4:
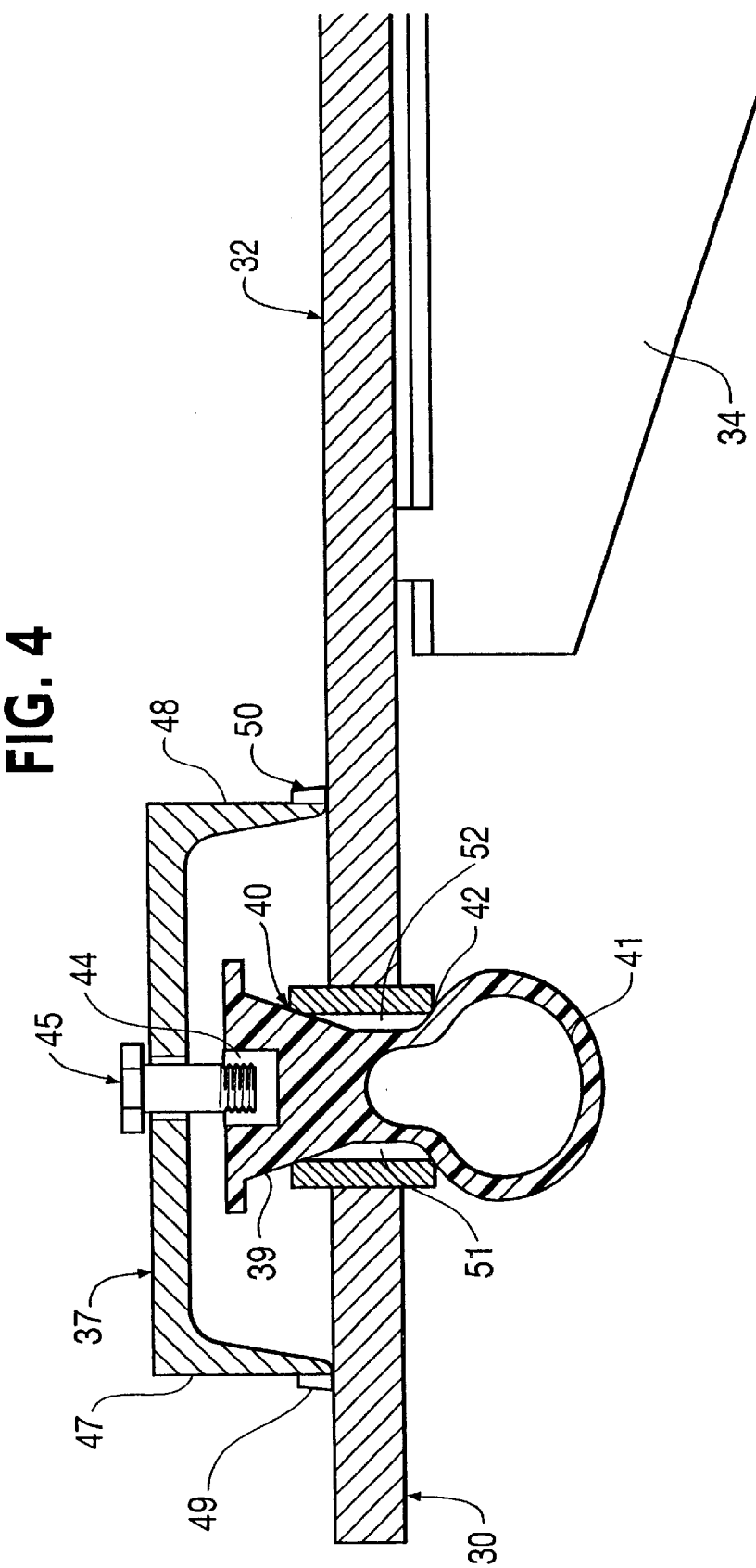
FIG. 4 is a cross-sectional view of the seal assembly shown in FIG. 3, with an inflatable elastomer seal shown in its inflated condition.

After the seal 36 is in place, as shown in FIG. 3, the tubular portion 41 is inflated until the seal 36 deforms into the configuration shown in FIG. 4. As the seal 36 expands, the walls of the tubular portion 41 come into contact with the secondary sealing surfaces 42 at the lower edges of the ledge ring 30 and the closure plate 32. As the inflation continues, the tubular portion 41 of the seal 36 expands beyond the width of the annular space 35 and a downward force is transmitted through the shank 43 of the seal 36 to the wedge portion 39, thereby drawing the wedge portion 39 downward into the annular space 35 between the ledge ring 30 and the closure plate 32. The wedge portion 39 engages the primary sealing surfaces 40 of the ledge ring 30 and the closure plate 32. The inflation is stopped when the tubular portion 42 reaches an internal pressure in the range typically between 25 to 100 psi, depending on the dimensions of the annular space 35 and the size of the seal 36.

Since the seal 36 can move independently, a small amount, from the annular support structure 37, the wedge-shaped portion 39 can easily conform to the seal surface irregularities in a self-adjusting manner. When the refueling pool 20 is filled with water, the weight of the water causes further confirmation of the wedge-shaped portion 39 to the sealing surfaces 40 since the seal 36 is not tightly restrained by the annular support structure 37.

The seal 36 has a plurality of threaded inserts 44 embedded in a top side around the circumference of the seal 36. The threaded inserts 44 are preferably insert-molded into the elastomer material of the seal 36, or secured with other suitable means to form an integral structure with the seal 36. Threaded shoulder bolts 45 extend through oversized or elongated holes 46 in the annular support structure 37 and into the inserts 44 to secure the seal 36 to the annular support structure 37. The threaded bolts 45 are sufficiently long that the seal 36 can be moved vertically relative to the annular support structure 37 after the bolts 45 are seated tightly into the inserts 44 of the seal 36. The bolts 45 and holes 46 allow the inflatable seal to move vertically and transversely relative to the annular support structure 37 so that the seal 36 can self align itself.

The annular support structure 37 is a generally channel-shaped annular member having a first leg 47 engaging the reactor vessel ledge ring 30, and a second leg 48 engaging the closure plate 32. Elastomer seals 49, 50 are secured to the first and second legs 47, 48 for engaging the ledge ring 30 and closure plate 32, respectively, and thereby providing a secondary seal between the ledge ring 30 and the closure plate 32.

The annular support structure 37 provides a structure for handling the inflatable elastomer seal 36 during installation and removal. The annular support structure 37 also forms a leak limiting device in the event the inflatable seal 36 is pulled or pushed through the annular space 35 between the ledge ring 30 and the closure plate 32. The annular support structure 37 reduces the potential for the seal 36 to be pulled or pushed through the annular space 35 since the annular support structure 37 forms a barrier to mechanical damage of the elastomer seal 36.

Figure 5:
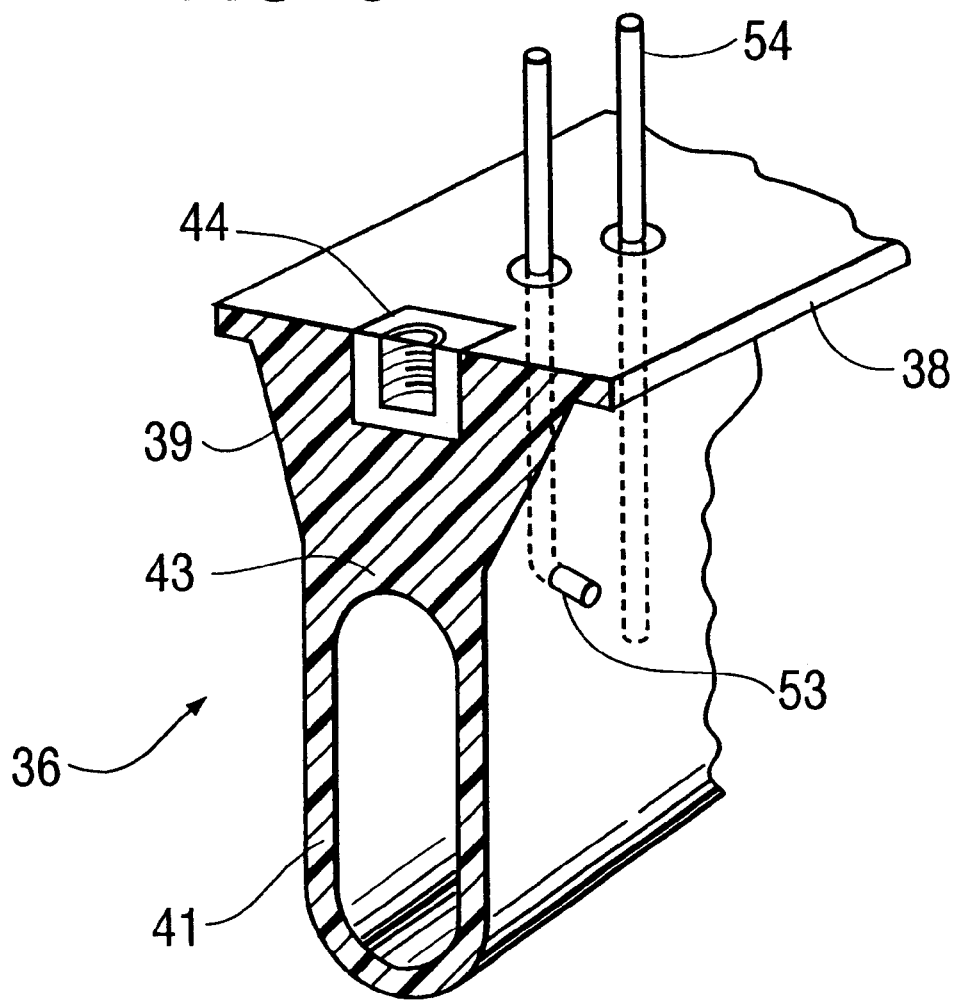
FIG. 5 is a perspective view of the inflatable elastomer seal used in the seal assembly of the present invention.

Once the inflatable seal 36 is properly positioned and inflated, the seal effectiveness must be tested before the refueling canal 20 can be filled with water. As shown in FIG. 4, the inflated seal 36 provides convenient test chambers 51, 52 between the wedge portion 39 and the tubular portion 41. The wedge portion 39 is a passive seal that provides the primary sealing interface against the head of water in the refueling canal 20. The tubular portion 41 of the seal 36 provides a secondary active sealing interface which will continue to function even if a leak occurs in the wedge sealing interface. When the seal 36 is inflated, the two test chambers 51, 52 are formed and a test probe 53, as shown in FIG. 5, can be introduced into the chambers 51, 52. A conventional air tap 54 through which air is introduced into the tubular portion 41 of the seal 36 for activating the seal 36 is also shown in FIG. 5.

Figure 6:
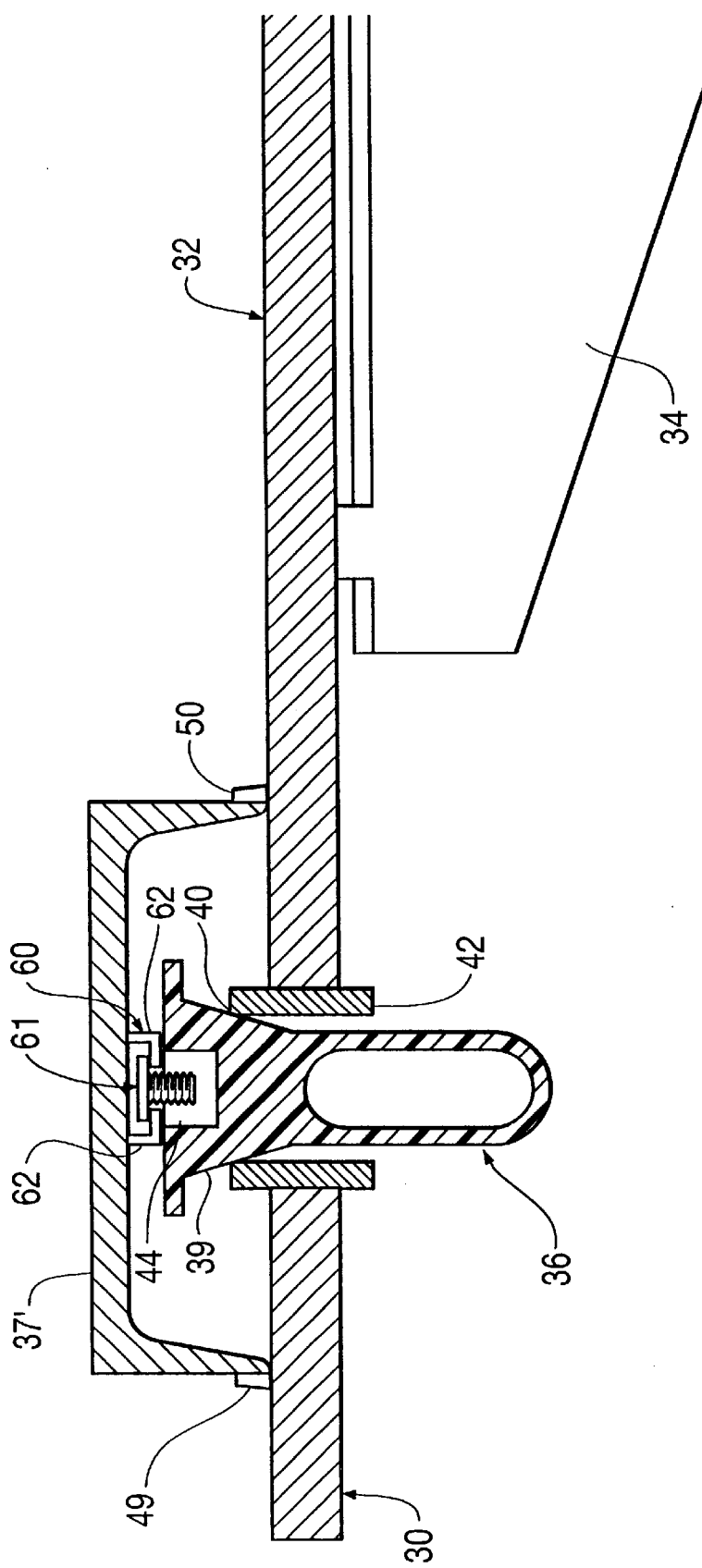
FIG. 6 is a cross-sectional view of the seal assembly according to a second embodiment of the present invention.

An alternative embodiment with a different means for attaching the inflatable seal 36 to the annular support structure 37 is shown in FIG. 6. In this arrangement, a bolt retainer 60 is secured to an underside of the annular support structure 37' and has a structure that permits the bolts 61 lbr securing the seal 36 to the annular support structure 37' to move both vertically and transversely relative to the annular support structure 37'. The bolt retainer 60 can be in the form of, for example, a pair of angle-shaped members 62, 62 positioned on each side of the bolts 61 and extending along the length of the annular support structure 37'. Alternatively, the bolt retainer 60 can be in the form of a channel-shaped member having elongated holes through which the bolts 61 are extended. To facilitate assembly, the bolts 61 can be extended through the bolt retainer 60 and threaded into the inserts 44 in the seal 36 before the bolt retainer 60 is secured to the annular support structure 37'. The bolt retainer 60 can then be secured to the annular support structure 37' by welding or other suitable means. Alternatively, the bolt retainer 60 can be provided with a keyhole-type opening having a large entrance through which the bolt head is introduced (after it is threaded into the insert 44) and then slid transversely away from the large entrance. In each of these arrangements, the bolts 61 are allowed to move vertically and transversely a small amount relative to the annular support structure 37' so that the seal 36 can more easily conform to the seal surface irregularities.

An advantage of the alternative structure shown in FIG. 6 is that the annular support structure 37' does not have any holes extending through its top surface for receiving the mounting bolts. Thus, the annular support structure 37' according to this embodiment provides a secondary sealing arrangement in the event the inflatable seal 36 loses its sealing effectiveness.

Figure 7:
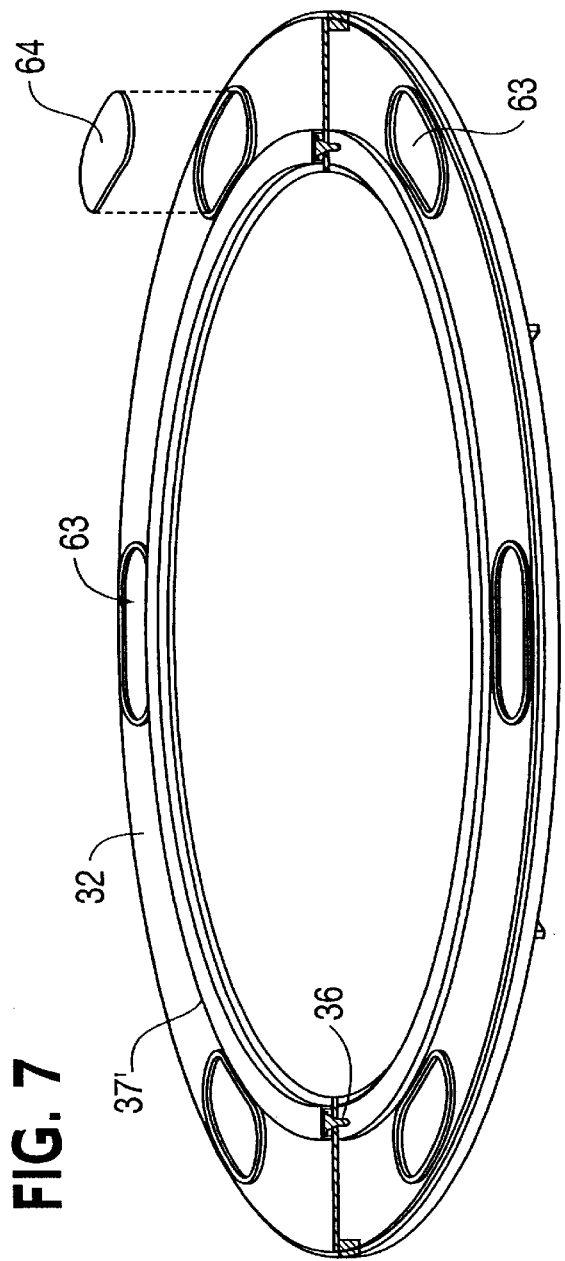
FIG. 7 is a perspective view of the assembled seal assembly according to the present invention.
Figure 8:
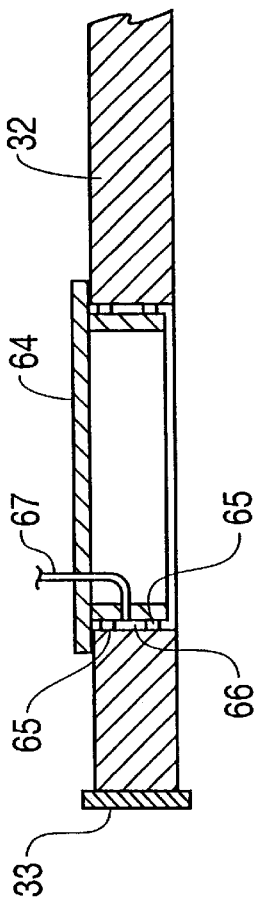
FIG. 8 is a cross-sectional view of the closure plate of the present invention showing an access port covered by a cover.

FIG. 7 shows a perspective view of the closure plate 32 and ledge ring 30 with the annular support structure 37' and seal 36 according to the present invention assembled thereto. As shown in FIG. 7, the closure plate 32 has a plurality of access ports 63 spaced about a circumference thereof. The access ports 63 permit access to the external core detectors and the reactor vessel cavity 14 with the closure plate 32 permanently attached to the canal ledge 22. The ports 63 are normally closed with bolted covers 64 and gaskets 65. In a preferred arrangement, as shown in crosssection view in FIG. 8, two O-ring gaskets 65 are arranged to form an annulus 66 between the gaskets 65. The annulus 66 can be pressurized with air through pressure connections and lines 67 to verify that the gaskets 65 and cover 64 form a leak tight joint between the cover 64 and the closure plate 32. The covers 64 are normally installed on the cover plate 32 and are only removed when access to the external core detectors or reactor vessel cavity 14 is required. A suitable structure for the access port covers 64 is disclosed, for example, in U.S. Pat. No. 5,102,612.

Although the present invention has been described as having a ledge ring 30 permanently secured to the vessel flange 24, the ledge ring 30 can be omitted and the inflatable seal 36 can be engaged with the vessel flange 24 directly. In this case, the closure plate 32 will be made slightly wider to extend closer to the vessel flange 24, and the other components will remain substantially the same as described above. An annular lip, similar to the lip 31 shown in FIGS. 2 and 3, can be secured to the vessel flange 24 directly to provide a suitable engaging surface for the inflatable seal member 36.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A seal assembly for sealing an annular space between two adjacent annular surfaces, comprising:
    an inflatable annular seal; and
    an annular support structure connected to and supporting said inflatable seal, said annular support structure having a generally rigid structure that straddles the annular space to be sealed and engages the surfaces on both sides of the annular space, whereby said annular support structure provides a structure for handling said inflatable seal during installation and removal and provides a leak limiting structure in the event the inflatable seal fails,
    wherein said annular support structure has a generally inverted U-shaped cross-section.

2. A seal assembly for sealing an annular space between two adjacent annular surfaces, comprising:
    an inflatable annular seal; and an annular support structure connected to and supporting said inflatable seal, said annular support structure having a generally rigid structure that straddles the annular space to be sealed and engages the surfaces on both sides of the annular space, whereby said annular support structure provides a structure for handling said inflatable seal during installation and removal and provides a leak limiting structure in the event the inflatable seal fails,
    wherein said inflatable seal comprises an upper wedge portion and a lower tubular portion, said lower tubular portion being expandable when pressurized to engage lower edges of said annular surfaces to form a secondary seal, said upper wedge portion being drawn into engagement with upper edges of said annular surfaces to form a primary seal when said tubular portion is further pressurized.

3. A seal assembly for sealing an annular space between two adjacent annular surfaces, comprising:
    an inflatable annular seal; and
    an annular support structure connected to and supporting said inflatable seal, said annular support structure having a generally rigid structure that straddles the annular space to be sealed and engages the surfaces on both sides of the annular space, whereby said annular support structure provides a structure for handling said inflatable seal during installation and removal and provides a leak limiting structure in the event the inflatable seal fails,
    wherein an inner one of said annular surfaces is associated with a reactor vessel annular flange in a nuclear reactor, and an outer one of said annular surfaces is associated with a closure plate secured to a surrounding ledge of a refueling canal.

4. The seal assembly according to claim 3, wherein said closure plate comprises a plurality of access openings extending therethrough, and a plurality of removable covers secured to said closure plate and covering said access openings.

5. A seal assembly for sealing a space between an annular flange on a nuclear reactor vessel and a surrounding ledge of a refueling canal to provide a temporary water barrier between the refueling canal and the reactor vessel, comprising:
    an annular closure plate having an outer portion secured to the surrounding ledge and an inner portion supporting a first sealing surface, said first sealing surface being disposed adjacent to a second sealing surface associated with the annular flange, and an annular space being formed between said first and second sealing surfaces;
    an inflatable seal disposed in said annular space for engaging said first and second sealing surfaces; and
    an annular support structure straddling said annular space, said inflatable seal being secured to said support structure and supported by said support structure during installation and removal.

6. The seal assembly according to claim 5, wherein said inflatable seal is movable vertically and transversely relative to said annular support structure to conform to irregularities in the first and second sealing surfaces.

7. The seal assembly according to claim 5, wherein said closure plate comprises a plurality of access openings and a plurality of removable covers secured to said closure plate and covering said access openings.

8. The seal assembly according to claim 5, wherein said annular support structure has an outer side engaging said closure plate, an inner side engaging a ledge ring associated with said annular flange, and a structure extending between said first and second sides for supporting said inflatable seal, said annular support structure providing a leak limiting structure in the event the inflatable seal fails.

9. A seal assembly for sealing an annular space between two adjacent annular surfaces, comprising:
   an inflatable annular seal; and
   an annular support structure connected to and supporting said inflatable seal, said annular support structure having a generally rigid structure that straddles the annular space to be sealed and engages the surfaces on both sides of the annular space, whereby said annular support structure provides a structure for handling said inflatable seal during installation and removal and provides a leak limiting structure in the event the inflatable seal fails,
   wherein said annular support structure has first and second legs that straddle said annular space, and elastomer seals associated with each of said legs to seal the interfaces between the legs and the respective annular surfaces.

10. The seal assembly according to claim 9, wherein said inflatable seal is movable vertically and transversely relative to said annular support structure to facilitate self alignment of said inflatable seal within said annular space.

11. The seal assembly according to claim 10, wherein said inflatable seal comprises a plurality of threaded inserts embedded in an upper surface thereof, and said annular support structure is connected to said inflatable seal using shoulder bolts threaded into said inserts.

12. The seal assembly according to claim 11, wherein said annular support structure has a plurality of slotted openings through which said bolts extend to connect said annular support structure to said inflatable seal.

13. The seal assembly according to claim 11, wherein said annular support structure has a bolt retainer secured to an underside of said annular support structure, and said bolts are retained by said bolt retainer in a manner that allows said inflatable seal to move vertically and transversely relative to said annular support structure.

* * * * *